United States Patent [19]
Gholson

[11] Patent Number: 5,955,020
[45] Date of Patent: Sep. 21, 1999

[54] APPARATUS AND METHOD FOR INJECTING CORROSION CONTROL COMPOUNDS INTO PIPE FLANGES AND THE LIKE

[75] Inventor: Mark T. Gholson, Houston, Tex.

[73] Assignee: Global Corrosion, Houston, Tex.

[21] Appl. No.: 08/638,113

[22] Filed: Apr. 26, 1996

[51] Int. Cl.[6] .................................................. B32B 31/06
[52] U.S. Cl. ........................ 264/262; 264/261; 264/316;
                              285/15; 285/294.2; 285/294.3; 277/316;
                              277/616; 277/924
[58] Field of Search ............................... 285/15, 293, 368,
                              285/294, 294.2, 294.3; 277/1, 9.5, 72 FM,
                              316, 616, 924; 264/262, 261, 313, 316,
                              259

[56] References Cited
U.S. PATENT DOCUMENTS
843,892  2/1907  Haller et al. ............................. 285/293
3,770,301 11/1973 Adams ........................................ 285/15

FOREIGN PATENT DOCUMENTS
2489918  3/1982  France ........................................ 277/1

*Primary Examiner*—Katherine A. Bareford
*Attorney, Agent, or Firm*—Robert C. Curfiss

[57] ABSTRACT

An apparatus and method for injecting corrosion control compound into a crevice or void such as pipe flanges featuring a corrosion control kit comprising a syringe injector having a detachable nozzle, a corrosion control compound, pipe tape and a mantle for heating the compound. Other optional items may be included in the kit. The method of the subject invention utilizes the apparatus, is cost efficient and easy to perform. The resulting seal formed between the flanges is easy to inspect and requires no maintenance.

16 Claims, 4 Drawing Sheets

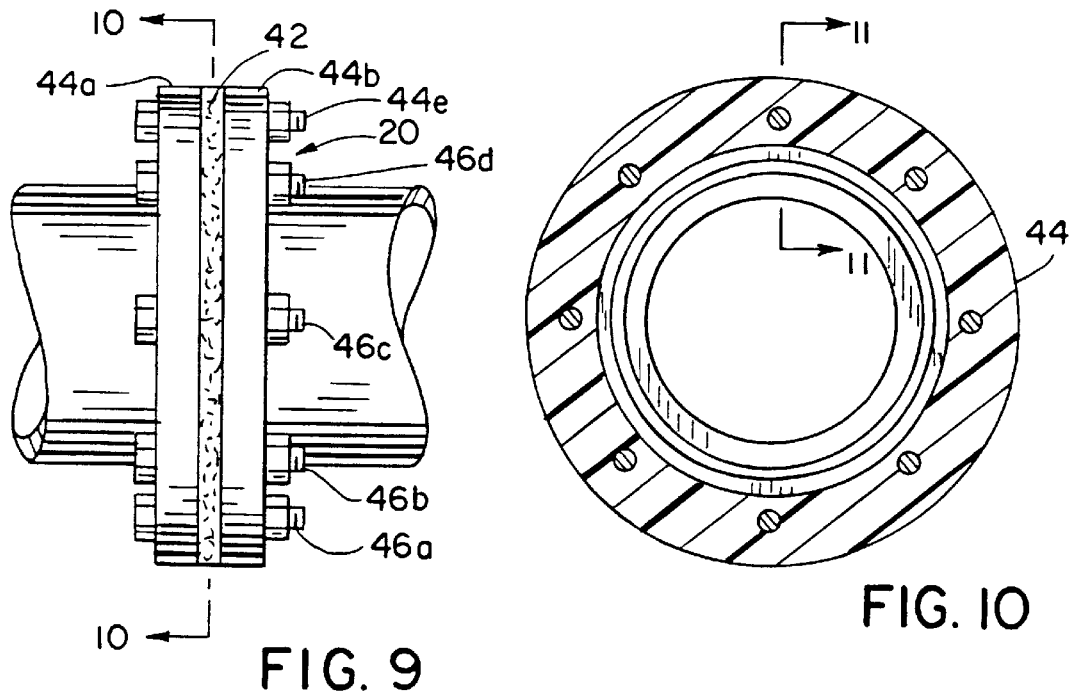
FIG. 9
FIG. 10
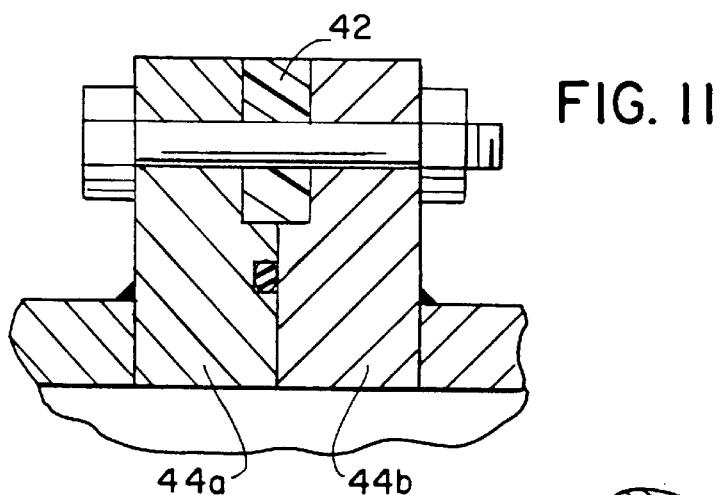
FIG. 11
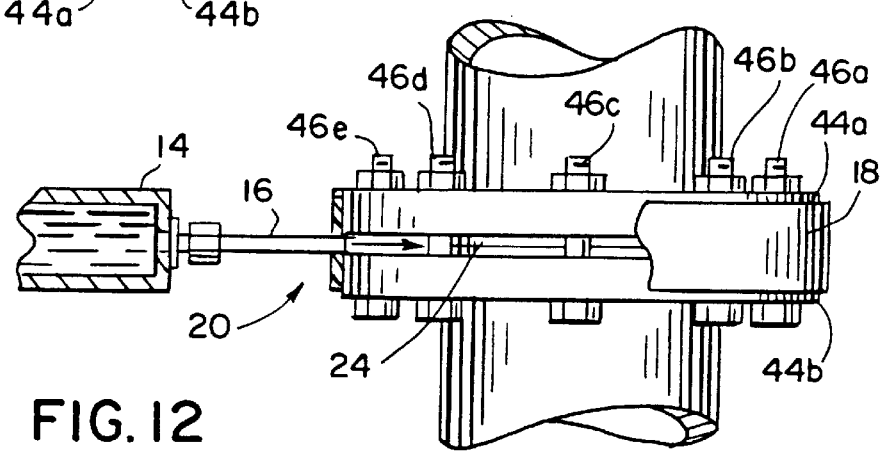
FIG. 12

APPARATUS AND METHOD FOR INJECTING CORROSION CONTROL COMPOUNDS INTO PIPE FLANGES AND THE LIKE

BACKGROUND OF THE INVENTION

1. Field of the Invention

This invention is generally related to corrosion control systems and is specifically directed to a corrosion control apparatus and method for protecting hard to reach crevices, openings and voids such as in pipe flanges.

2. Description of the Prior Art

Poorly coated pipe flanges in corrosive environment are the leading cause of premature paint failure on process pipe and surrounding platforms. Many crevices and annular spaces exist in the body of a flange and sealing faces. These areas are difficult to coat. Inevitable damage to the coating system of the flange occurs when it is assembled. Once in service, it is impossible to coat the inner spaces of flange. What results is exposed steel, free to corrode in the atmosphere. Any ingress of water into the flange makes bare steel corrode. Water from rain, offshore storms, washdown, drilling or any other cause, accelerates the corrosion. Draining water then pushes the corrosive substances out of the flange gaps to drip onto adjacent painted surfaces.

The problem is further exacerbated on older flanges having corrosion already inside. Indeed, when existing flanges are painted, it is not uncommon to find residual blasting sand or grit lodged between the fasteners and the flange body, or inside the bolt hole annuli. This grit acts like a sponge to retain water inside the flange and promote rapid failure of the applied paint system. Flange corrosion maybe visible after three to six months after the flange has been painted.

For many industries, the cost of painting process piping represents a major percentage of the corrosion control budget. Since the earliest signs of paint failure typically occur on the small diameter piping and fitting, they are painted more frequently than the structural area. Therefore, the cost per square foot to paint flanges is often as much as three and one half times greater than structural areas.

Crevice corrosion at the gasket to flange interface with its associated progressive failure of neighboring painted surfaces is a problem industries have long recognized. Since corrosion failure often stems from poorly coated flanges, many different methods and devices have been developed in an attempt to seal the flange, each having its own failings.

Flange protectors are the most expensive approach to corrosion control and have many problems associated with their use. A crevice is formed when the band is attached to the flange. The crevice accelerates the coating failure on the outside of the flange. Ultimately the corrosion substances under the band will swell and cause deformation of the band and even possible breakage. To be effective, periodic maintenance is required to check and refill the inhibited grease injected into the annular confines. However, this is impractical for many applications. Furthermore, corrosion maybe ongoing under a deformed protector and there is no way to see it.

Caulking compounds of various types have also been used to fight corrosion. These compounds are unsuccessful for many reasons. Caulk does not bond to steel. Thus, a tight crevice is formed, retaining water through capillary action. Further, once the initial seal is violated, remaining caulk actually retains water by preventing natural evaporation.

Another method of preventing corrosion includes temporarily sealing the flange by filling it with a wax material. This approach is expensive and does not allow for inspection of the flange. As an alternative, a flange may be flooded with conventional paint. However, because paints do not establish a bond with corroded steel, there is no long term protection.

Although there have been various attempts to fill and tape flange connections, the prior art methods are labor intensive, increasing the cost of installations. Often the sealing material does not displace all the water and does not wet the steel. Anaerobic conditions result, with an associated microbial induced corrosion risk. Taping alone is not a good idea as it has a limited life and upon failure, the problem is free to continue. In addition, many substances used as the fill contain pollutants and are environmental unsafe.

A need exists therefore for a cost effective method of controlling corrosion of pipe flanges that is easy to apply, capable of being inspected, displaces residual moisture, requires no maintenance, is environmentally safe and will endure the life of the paint system.

SUMMARY OF THE INVENTION

The subject invention is an apparatus and method for protecting pipe flanges from corrosion. The invention is described in a single preferred embodiment. The preferred embodiment provides a kit which accommodates the necessary items to form a seal between two pipe flanges. The resulting seal, designed to endure the life of the system, is easy to inspect and requires no maintenance. The method of the present invention is easy to perform and requires little clean up, if any.

The corrosion protection kit of the subject invention includes a corrosion control compound, a mantle for heating the compound, a syringe injector having a detachable nozzle, and pipe tape. The kit may also include a variety of other optional items used to carry out the method of the subject invention. These optional items include a thermostat for monitoring the temperature of the mantle, thermal insulating jacket for surrounding a can of the corrosion compound once heated, a set of interchangeable nozzles to accommodate various size flanges, and a cleaning solution. In addition, for the user, work gloves, a knife, and safety goggles may be provided. All of these items may be stored and transported in a carrying case.

The corrosion protection kit of the subject invention is particularly suitable for use in connection with the method provided herein. This method may be carried out using steps, easy to perform. While the corrosion compound is heating in the mantle, pipe tape is applied around the flange such that the gap between the flanges is centered under the tape. A vent is punctured into the tape at the 12 o'clock position on the pipe. At approximately 180 degrees from where the tape is overlapped, an insertion hole for receiving the nozzle of the syringe injector is created.

Once the compound is heated to liquid, with the injector handle completely pushed in, the nozzle of the syringe injector is inserted into the compound and the handle withdrawn fully to fill the syringe injector. The nozzle is then pushed through the insertion hole and the compound is injected into the flange gap until it begins to discharge from the vent. The tape is removed from the flange. The flange connection may be cleaned of excess compound with a rag and cleaner solution, if needed.

The preferred corrosion control compound is wax based and remains soft at ambient temperature. It is a paraffinic based compound which is easy to apply, contains no pollutants and is environmentally safe. One suitable compound is sold under the trademark, SNOKOTE® manufactured by Global Corrosion Technologies, Inc., Houston, Tex. The preferred flange tape is a modified pipe tape that contains no rubber and includes properties to permit it to withstand heat without expansion. Further, it will adhere to the paint surface under pressure without damaging the paint upon removal. One very effective tape is sold under the trademark, FLANGETAPE® offered by Global Corrosion Technologies Inc., Houston, Tex.

Because the apparatus and method are not size specific, the cost of materials and labor are minimized. The present invention is not weather dependent. Thus flanges may be treated in paint project downtime, or as a winter activity. After the flange is treated by the method of the subject invention, the flange remains fully inspectable and accessible to maintenance. This method and apparatus is a simple, but effective solution to a very costly corrosion problems.

It is an object and feature of the present invention to provide a method and an apparatus for protecting pipe flanges from corrosion.

It is a further object and feature of the present invention to provide a corrosion control kit for sealing pipe flanges in a cost effective and environmentally safe manner.

It is yet another object and feature of the present invention to provide corrosion control protection for pipe flanges that requires no maintenance and is easy to inspect.

These and other objects and features of the invention will be readily apparent from the accompanying drawings and detailed description of the preferred embodiments.

BRIEF DESCRIPTION OF THE DRAWINGS

FIG. 9 is a side plan view of the sealed flanges.

FIG. 10 is a cross sectional view take along line 10—10 of FIG. 9 showing flange gap as sealed upon completion of the method of the present invention.

FIG. 11 is a cross sectional view of the flange connection depicting the flange seal and the annulus surfaces that are protected.

FIG. 12 is a side plan view of the straight syringe nozzle as inserted into the gap between flanges.

DETAILED DESCRIPTION OF THE PREFERRED EMBODIMENTS

FIGS. 1 to 12 represent the preferred embodiment of the subject invention designated generally as a method for protecting pipe flanges from corrosion and a corrosion control kit 10.

Figure 1:
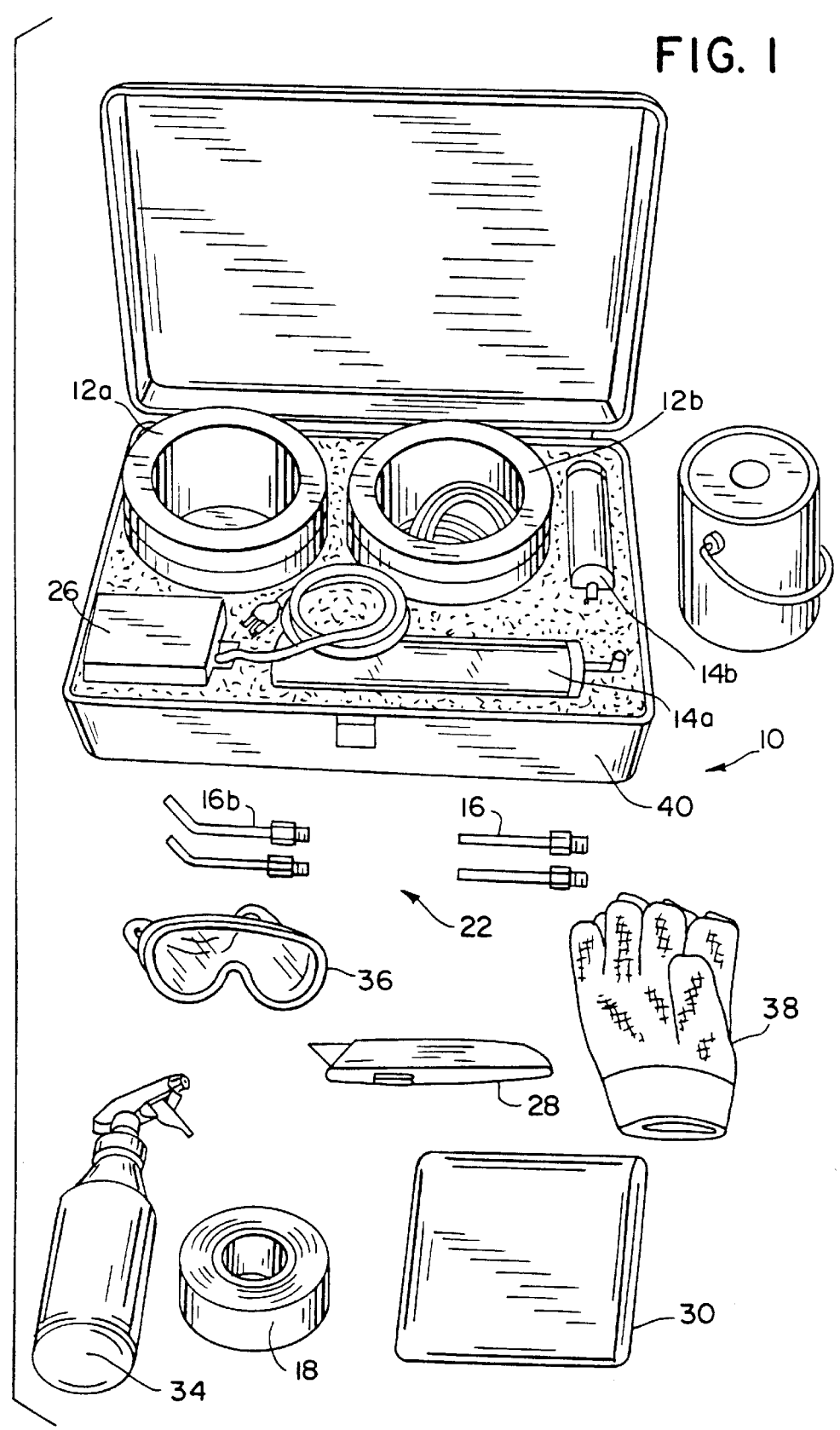
FIG. 1 is a collective view of the items included in the corrosion protection kit .

Referring specifically to FIG. 1, the corrosion control kit 10 comprises a mantle 12 for heating a corrosion control compound (not shown), a syringe injector 14 having a detachable nozzle 16 and pipe tape 18. As illustrated in FIG. 1, the preferred kit 10 contains all the necessary items to protect a pipe flange connection 20 from corrosion, carry out the method of the subject invention and make a seal 42 that is easy to inspect and designed to last the life of the paint system.

Figure 6:
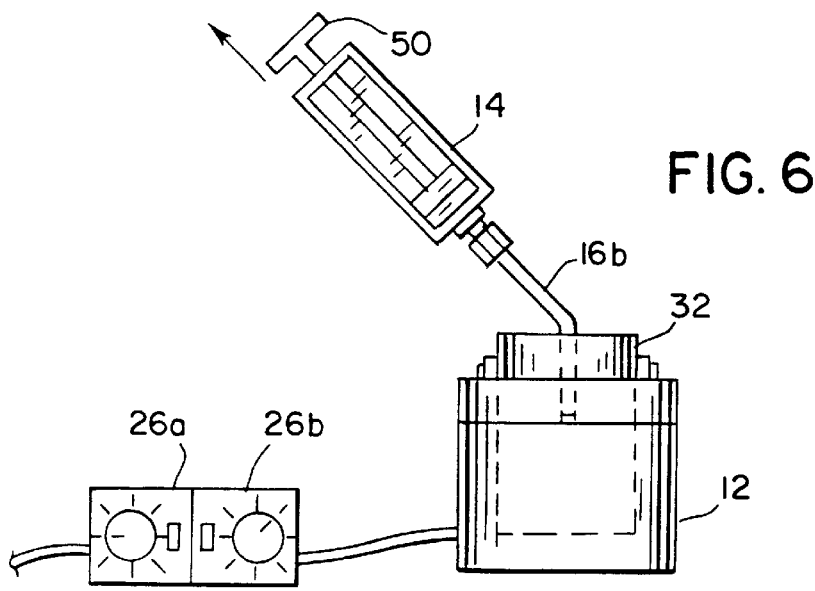
FIG. 6 is a schematic side view of the syringe injector inserted into the corrosion control compound.
Figure 7:
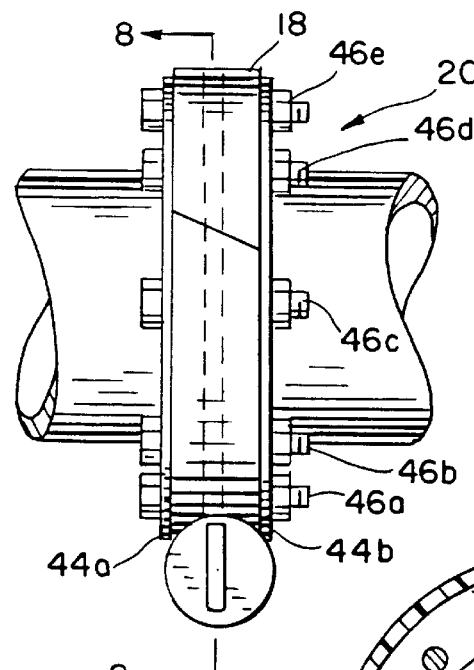
FIG. 7 is a side plan view of the syringe nozzle positioned within the gap between taped flanges.
Figure 8:
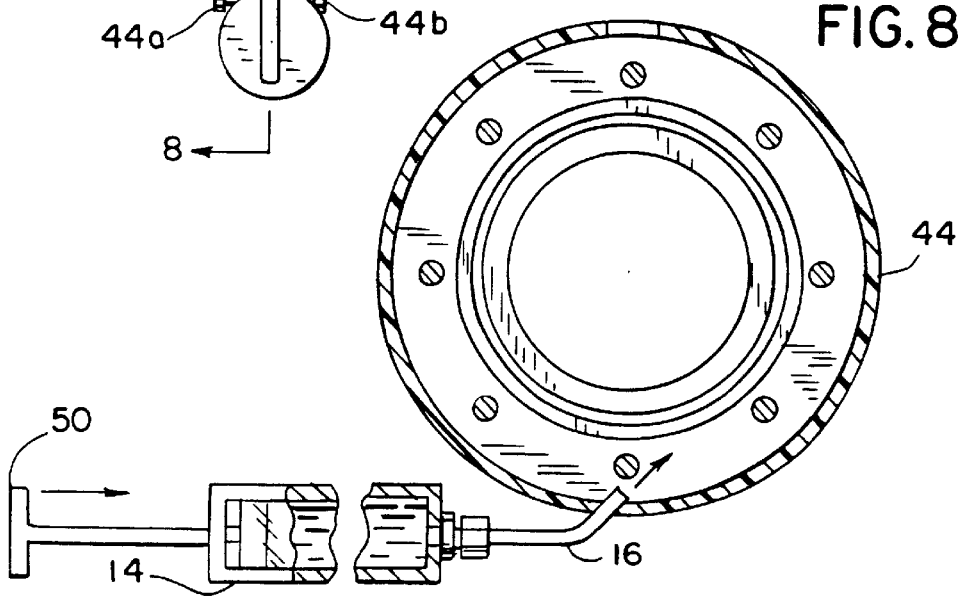
FIG. 8 is a crossed sectional view taken along line 8—8 of FIG. 7 showing an angled syringe nozzle inserted.

In the preferred embodiment of the corrosion control kit 10, there are a number of optional items. One such option is a set of interchangeable nozzles 22. The set of interchangeable nozzles 22 provides the user with a variety of nozzle sizes to accommodate different flange sizes and angles. Each nozzle 16 may be attached and detached from the syringe injector 14 as needed. In addition, as shown in FIGS. 1, 6 and 8, angled nozzles 16b may be used for protecting the hard to reach pipe flange connection 20.

Similarly, the preferred kit may also contain two different sizes of syringe injectors 14a, 14b, a large syringe injector 14a and a small syringe injector 14b. The large syringe injector 14a is for use with larger sized flanges, whereas the smaller syringe injector 14b may be used for smaller pipe flanges. The syringe capacity may be customized for each specific application. It is important that the syringe be capable of holding enough compound to complete the application with a single injection. Although the large syringe injector 14a may be used for any application, as discussed below, when used in connection with smaller flange sizes, care must be taken not to completely empty the entire contents of the syringe injector 14 into the flange gap 24.

Figure 3:
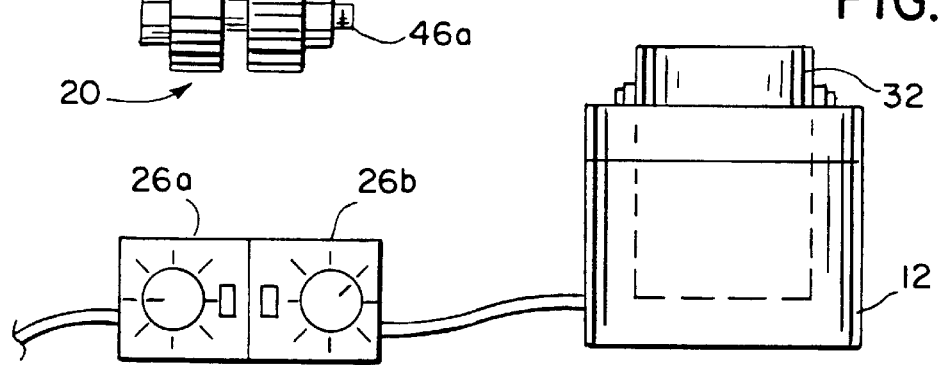
FIG. 3 is a schematic side view showing the optional thermostat control of the mantle having a can of corrosion control compound inside the mantle.
Figure 4:
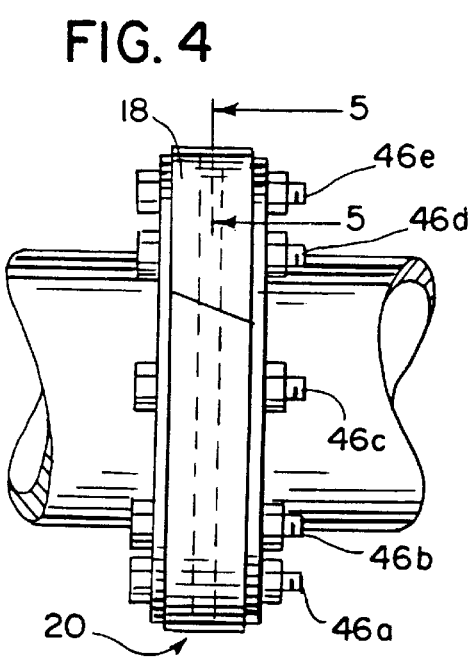
FIG. 4 is a side view of the pipe flange connection after pipe tape has been applied.

Another optional feature of the corrosion control kit 10 is a second mantle 12b for heating the corrosion control compound. As depicted in FIGS. 1, 3, and 6, each mantle 12a, 12b may be controlled by a thermostat 26. If dual mantles 12a, 12b are used, a dual thermostat 26a, 26b may be utilized. Each side of the dual thermostat 26a, 26b functions independently and controls the heating of each separate mantle 12a, 12b independently of the other.

The corrosion control kit 10 may include other items such as a knife 28 for cutting the pipe tape 20, and a thermal insulating jacket 30 for containing a can 32 of the corrosion control compound after it has been heated. An optional cleaner solution provided in spray dispenser 34 may be useful to clean up any excess compound that remains on the flange 44. Additionally, as shown in FIG. 1, user gear such as safety goggles 36 and working gloves 38 may also be provided. All the items of the kit 10 are designed to fit in a kit carrying case 40.

The preferred corrosion control compound is a paraffinic based compound designed to displace water. The preferred compound contains a rust converter. The corrosion control compound should be non toxic with zero VOC (volative organic compounds) such as, by way of example, benzene. The preferred compound should penetrate any pre-existing surface film to bring the compound into direct contact with the microstructure without penetrating it. The preferred compound should not require any surface preparation. It is also preferred that the corrosion control compound be contained in a can 32 or other container which may be inserted into the mantle 12. In the preferred embodiment can 32 is a gallon paint can. One suitable compound is sold under the trademark, SNOKOTE® manufactured by Global Corrosion Technologies Inc., Houston, Tex.

The preferred pipe tape 18 contains no rubber and contains properties to withstand heat without expansion. One suitable pipe tape useful for the method of the subject invention is sold under the trademark of FLANGETAPE® offered by Snokote, Inc., Houston, Tex. Other pipe tapes 18 are also suitable for use with the subject invention.

An optional soap base cleaner solution may also be applied after the flange connection is sealed without effecting the corrosion resistance of coating of the invention. One suitable cleaner is sold under the trademark, SNOMELT® offered by Global Corrosion Technologies Inc., Houston, Tex. Other cleaners having similar composition and properties are also suitable.

Figure 2:
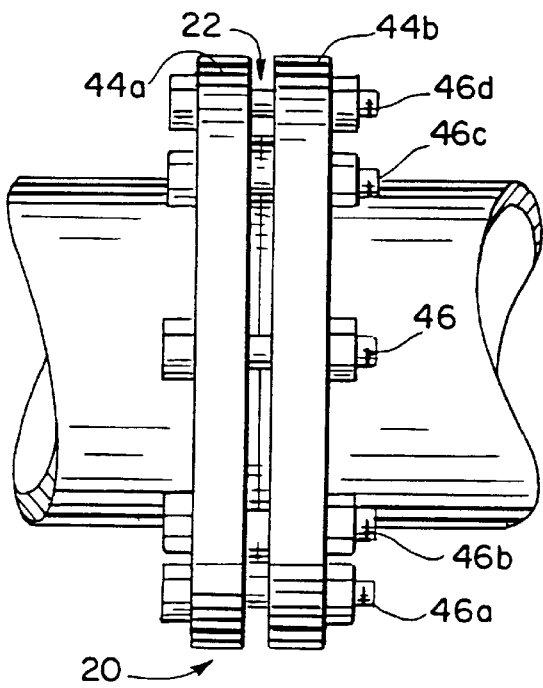
FIG. 2 is a side elevational view of the typical flange connection to be protected by the method of the subject invention.

FIG. 2 depicts a typical pipe flange connection 20 having two flanges 44a, 44b connected together by a series of bolts 46a, 46b, 46c, 46d, 46e. Between the two flanges 44a, 44b there is a gap 24. If the pipe flange connection 20 remains unprotected, the flange 44, particularly the area surrounding flange gap 24, will corrode. The kit 10 should be set up near the flanges selected to be treated.

The method of the subject invention is directed to filling the flange gap 24 with the corrosion control compound to provide a seal 42 that protects the flanges 44a, 44b from corroding. The method uses only hand equipment as provided in the kit 10. It is estimated that an inexperience operator may be trained in thirty (30) minutes to safely use the kit 10.

In the preferred embodiment, the corrosion control compound is heated within the mantle 12 until the compound is completely in a liquid phase having a viscosity similar to water. It is preferred that the heating mantle 12 remains out of the wind and weather. The temperature of the mantle 12 may be controlled by a thermostat 26. As shown in FIG. 1, if two mantles 12a, 12b are provided, a dual thermostat 26a, 26b should be utilized. Also, as clearly depicted in FIG. 3, each thermostat 26a, 26b independently controls each mantle 12a, 12b. If a thermostat 26 is used, the corrosion control compound, SNOKOTE® is heated to 180 degrees Fahrenheit.

Preferably, a can 32 having a removable center plug (not shown) in the lid (not shown) holds the corrosion control compound. The can 32 may be equipped with a vent tube (not shown) which is inserted in the bottom of the can prior to heating. Failure to insert a vent tube in the can could result in material rising out of the can. After the corrosion control compound is placed in the mantle 12, the pipe flange connection 20 to be treated are selected. Any dirt, blast grit or other debris should be removed from the area around the flange gap 24.

Figure 5:
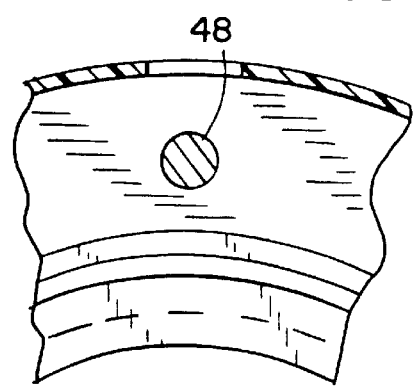
FIG. 5 is a cross sectional view taken along the line 5—5 of FIG. 4 showing the vent.

Pipe tape 18 is then wrapped around the flange connection. As shown in the figures, the method comprises: (1) for vertical flanges (pipes running horizontally), (a) begin wrapping the pipe tape 18 at the 5 or 7 o'clock position on the flange 44, (b) continue to apply pipe tape 18 around the flanges 44 a,b such that the flange gap 24 is centered under the tape 18, (c) overlap the pipe tape 18 two to three inches (2–3 inch.) and cut, and (d) using a utility knife 28, puncture a small hole in the pipe tape 18 at the 12 o'clock position to form a vent 48 as shown in FIG. 5. (2) For horizontal flanges (pipe running vertically) as shown in FIG. 12, (a) start at a convenient point on the flange, (b) wrap the flange as described above, (c) puncture the sharp end of one of the plastic vent tubes (not shown) through the tape at a location approximately 180 degrees from where the tape is overlapped, and (d) run the vent tube (not shown) up the pipe and secure with a piece of tape. This can be left until just before treating if a large number of flanges are to be prepared.

When taping, apply a little tension by hand as the tape is applied. This will improve adhesion.

Once the compound is completely liquid, remove the vent tube from the can and remove the can from the mantle 12. Install a thermal insulating jacket 30 to the can if the ambient air temperature is less than 70 degrees Fahrenheit. Select the appropriate syringe injector 14 and detachable nozzle 16. For hard to reach applications, the angled nozzle 16b as shown in FIG. 8 may be most useful. Additionally, as discussed above, the smaller syringe nozzle may be easier to use and more efficient on smaller flanges. The nozzle shape and size is not critical to the invention as is dictated by the specific application.

Upon selecting the appropriate syringe injector 14 and nozzle 16, push the handle 50 of the injector 14 fully into the injector 14. As shown in FIG. 6, insert the nozzle 16 into the compound and withdraw fully to fill the syringe injector 14. As shown in FIGS. 8 and 12, push the nozzle 16 through the double section of pipe tape 18 into the flange gap 24 and inject the compound until it discharges from the vent 48. Immediately pull the injector handle 50 on the syringe injector 14 to remove excess material. Discharge material back into the can. When filling the syringe injector 14, discharge a small amount of material several times to prevent material from solidifying in the nozzle 16. Remove the pipe tape 18 from the flange connection 20 and clean off the excess corrosion control compound with the cleaner solution contained within the spray dispenser 36.

The remaining flange seal 42 will provide corrosion control for the life of the paint system. In the drilling industry, the flange seal has anticipated life of ten years based on accelerated salt fog and UV exposure tests completed on existing seals where no corrosion or material degradation was noted after two thousand (2000) hours of exposure.

It must be understood that certain variations in the subject invention may be made without departing from the scope of the invention.

I claim:

1. A method for injecting a protective coating into a crevice bounded by an exterior surface and an interior surface, the method comprising the steps of:

(1) applying tape around the exterior surface of the crevice to define a gap area between the tape and the interior surface and to form a temporary seal between the tape and the exterior surface;

(2) filling a syringe injector having a nozzle with a corrosion control compound;

(3) placing the syringe nozzle into the gap area;

(4) dispensing compound from the syringe injector through the nozzle into the gap area to form a seal plug in the gap area; and (5) removing the tape from the exterior surface.

2. The method of claim 1 further comprising the step of: heating the corrosion control compound with a mantle.

3. The method of claim 1 further comprising the step of: creating a vent and an insertion hole in tape.

4. The method of claim 3 wherein said corrosion control compound is dispensed into the gap area until said compound extrudes from the vent.

5. The method of claim 1 further comprising the step of: removing debris from the flange before step (2).

6. The method of claim 1 further comprising the step of: cleaning excess compound from flanges once the seal plug is formed.

7. The method of claim 1 wherein said corrosion control compound is paraffinic based.

8. A method for sealing a pipe flange connection formed of adjacent pipe flanges with a crevice defined therebetween, the method comprising the steps of:

(1) placing a can of corrosion control compound into a mantle for heating;

(2) removing debris from the pipe flange connection;

(3) applying pipe tape on said adjacent pipe flanges to enclose the crevice, to define a gap area bounded by the tape and pipe flanges, and to form a temporary adhesive seal between the tape and the pipe flanges;

(4) creating a vent and an insertion hole in the pipe tape;

(5) placing a syringe injector having a nozzle into the heated compound and filling the injector with the compound;

(6) dispensing the compound through the nozzle of the syringe injector into the flange gap area through the insertion hole and until the compound extrudes from the vent;

(7) removing the pipe tape from the flange connection; and (8) cleaning off excess compound from the flanges.

9. The method of claim 8 further comprising the step of:

selecting a nozzle from an interchangeable set of straight and angled nozzles.

10. The method of claim 8 wherein the corrosion control compound is heated until the compound is completely liquid.

11. The method of claim 8 further comprising, prior to step (5) the steps of removing a center plug in the lid of the can and inserting a vent tube in the bottom of the can.

12. The method of claim 8 wherein a knife is used to poke a small vent in the pipe tape at the highest portion of the gap area.

13. The method of claim 8 wherein excess compound is removed from the flanges with a cleaning solution.

14. The method of claim 8 wherein the vent hole is created at a position furthermost from the insertion hole.

15. The method of claim 8, wherein the flanges each have a peripheral surface and the step of applying pipe tape is accomplished by wrapping the tap around the peripheral surfaces.

16. The method of claim 15 wherein the pipe tape overlaps between about two to three inches.

* * * * *